R. F. GOECKE.
KETTLE JACKET CONNECTING MEANS.
APPLICATION FILED MAR. 21, 1916.

1,270,284.

Patented June 25, 1918.
2 SHEETS—SHEET 1.

INVENTOR
Rudolf F. Goecke
BY
J. O. Richey
his ATTORNEY

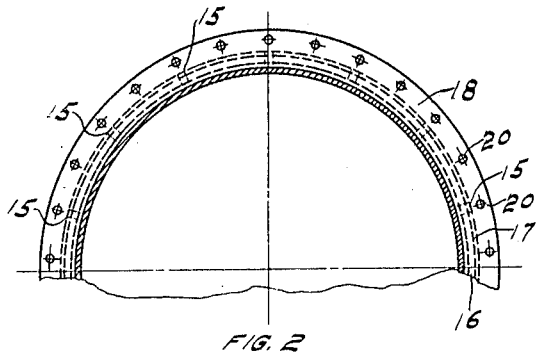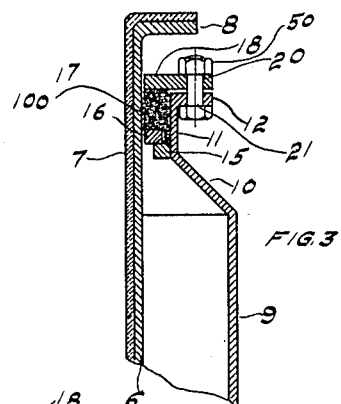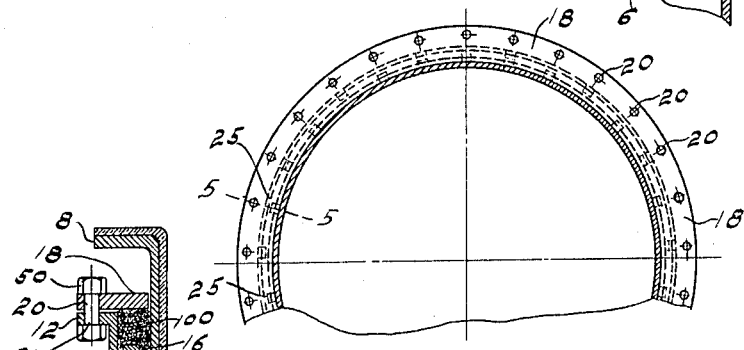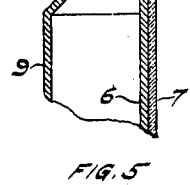

UNITED STATES PATENT OFFICE.

RUDOLF F. GOECKE, OF ELYRIA, OHIO, ASSIGNOR TO THE ELYRIA ENAMELED PRODUCTS COMPANY, OF ELYRIA, OHIO, A CORPORATION OF OHIO.

KETTLE-JACKET-CONNECTING MEANS.

1,270,284.  Specification of Letters Patent.  Patented June 25, 1918.

Application filed March 21, 1916.  Serial No. 85,619.

*To all whom it may concern:*

Be it known that I, RUDOLF F. GOECKE, a subject of the Emperor of Germany, residing at Elyria, in the county of Lorain and State of Ohio, have invented certain new and useful Improvements in Kettle-Jacket-Connecting Means; and I do hereby declare the following to be a full, clear, and exact description of the invention, such as will enable others skilled in the art to which it appertains to make and use the same.

My invention relates to means for connecting kettles and their inclosing jackets together, and more particularly to means for connecting enameled kettles to inclosing jackets, whereby a gas-tight joint is provided which can be readily opened and closed by unskilled labor for the purpose of removing a kettle and substituting a new one. It is my aim to produce a device of this kind which will effectively seal the connection between the jacket and the kettle without danger of injuring the delicate enamel upon the kettle.

I also aim to provide means which is so constructed that it can be removed and reapplied by unskilled labor or those who are either ignorant or careless, without danger of injuring the enamel upon the kettle or that substituted.

I also aim to provide means which makes it impossible to injure the enamel of either kettle even in the operations for securing a tight gas-proof joint.

Other objects of my invention and the invention itself will probably be better understood from a description of an embodiment of my invention.

Fig. 2 is an elevation taken along the line 2—2 of Fig. 1, with a portion of the parts broken away.

Fig. 3 is an enlarged sectional view of a portion of the device illustrated in Fig. 1.

Fig. 4 is a view corresponding to Fig. 2 of a modification of the embodiment shown in Fig. 1.

Fig. 5 is an enlarged sectional view of the portion of the embodiment shown in Fig. 4 taken through line 5—5 of Fig. 4.

Figure 1:
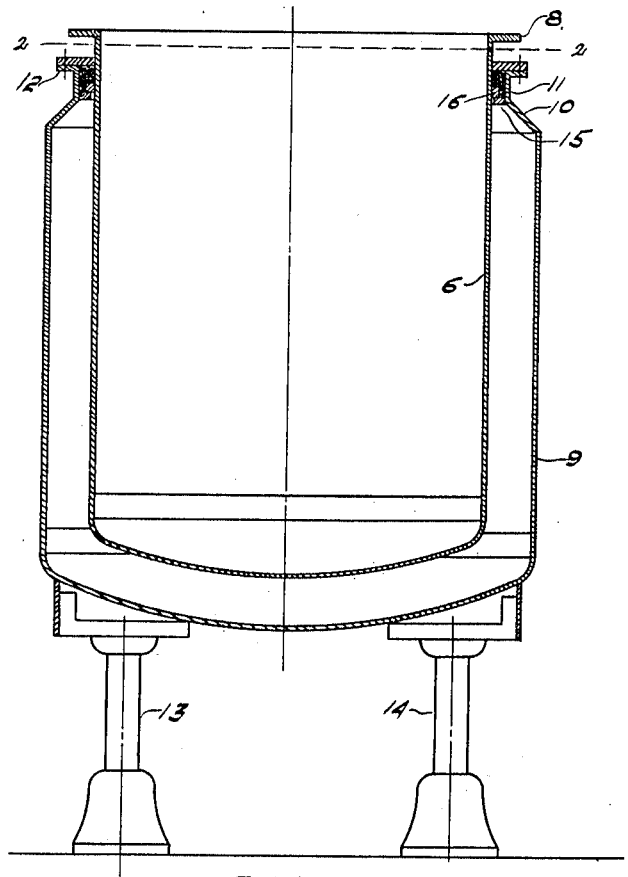
Figure 1 is a section through an embodiment of my invention.

Referring now first to the embodiment of my invention illustrated in Figs. 1, 2 and 3, at 6 are shown the walls of a kettle which is enameled, the enamel being illustrated at 7 in Fig. 3. The top of the kettle may be provided with a flange 8. The kettle is preferably made cylindrical and is adapted to be placed in a jacket whose walls are shown at 9. The jacket is adapted to be filled with fluid, such as hot gases for heating the contents of the kettle 6. In the form shown the walls of the kettle are tumbled or turned in toward the top, as shown at 10, provided with an upright collar 11 which is provided with a flange 12, preferably turned outwardly upon the top thereof. Supporting means, such as pedestals 13 and 14, are provided for supporting the jacket and the kettle.

It is very important to mount and dismount the kettle without injury to the enamel which is in many instances a vital part of the kettle, especially if acid proof enamels are used, for once the enamel is cracked or broken so the acid leaks into the metal wall 6, the wall will quickly be eaten away and the usefulness of the kettle destroyed. Many of the kettles are massive and are handled by unskilled labor, so that there is danger of cracking the enamel in such handling, especially when the connection between the kettle and the jacket is made, there being a tendency on the part of unskilled labor to contract or press together the walls of the kettle in making this joint, thereby injuring the enamel.

I provide means for making a tight, absolutely gas-proof joint, in such a manner that it is impossible to injure the enamel.

In the form shown in Figs. 1, 2 and 3 lugs 15 are mounted upon the wall of the jacket, preferably upon the lower part of the collar 11. These lugs may be connected to the walls by any suitable means. A ring 16, preferably rectangular in cross section and preferably lesser in outer diameter than the inner diameter of the collar 11, is mounted on top of the lugs 15 forming with the lugs a support for the packing 17, or a bottom for the packing cell 100, which is mounted in such cell between the collar 11 and the wall 6 of the kettle. The flange 12 is provided with a plurality of openings for a purpose to be described. An annular member 18 is provided which is preferably rectangular in cross section, and which is placed over the top of the packing 17, said annular member being provided with a plurality of openings 20. The member 18 is connected to the flange 12 by any suitable means, such as bolts 21.

In the embodiment shown in Figs. 4 and 5, a number of lugs 25 are connected to or formed upon the walls of the kettle, serving to supplement the lugs 15 in supporting the ring 16.

When it is desired to remove a kettle, the nuts 50 upon the bolts 21 are removed and the bolts extracted, or, in some instances, it may be necessary only to loosen these bolts. The member 18 is then lifted sufficiently to remove the pressure from the side of the kettle and the kettle is taken from the jacket. A new kettle is then placed in position and the nuts on the bolts drawn down tightly, forcing the member 18 downwardly and compressing the packing 17, forcing it out against the walls of the kettle, it being apparent that no matter how great a pressure is applied to the member 18, it will not be sufficient to cause the cracking of the enamel, owing to the fact that the only pressure brought upon the walls of the kettle will be through the soft packing material 17. When it is desired to place other packing between the jacket and the kettle, the nuts will be removed and the member 18 lifted, the packing then being inserted between these members and the parts being brought together again without danger of injury to the enamel of the kettle.

I have illustrated these embodiments and these details for the purpose of better describing my invention, and not that I wish to be limited to them. It will be apparent to those skilled in the art that many departures may be made from these forms and these details without departing from the spirit of the invention.

I claim:—

1. In a device of the class described, the combination of an enameled kettle, a jacket for said kettle in which the kettle is adapted to fit, leaving a space between the walls of the kettle and the jacket, said space being provided with a mouth, a plurality of lugs connected to the kettle wall adjacent said mouth, said lugs being spaced apart and being mounted at intervals around the periphery of said mouth and all in substantially the same plane, an annular member smaller in diameter than the diameter of the jacket wall and greater in diameter than the kettle wall placed upon said lugs and extending over the space between the ends of the lugs and the kettle wall, a mass of packing placed around said kettle wall on said lugs and annular member and between the kettle wall and the jacket wall, an outwardly turned flange on the top of the jacket wall provided with a plurality of perforations, an annular member placed over said packing and said flange, said annular member being provided with a plurality of perforations corresponding to the perforations in the flanges, a plurality of bolts each passing through a hole in said flange and a hole in said annular member and nuts on said bolts for drawing said annular member on said flange and forcing said packing into the mouth of the opening and against the kettle wall acting in a direction parallel to the jacket wall.

2. In a device of the class described, the combination of an enameled kettle, a jacket for said kettle in which the kettle is adapted to fit, leaving a space between the walls of the kettle and the jacket, said space being provided with a mouth, a plurality of lugs connected to the kettle wall adjacent said mouth, said lugs being spaced apart and being mounted at intervals around the periphery of said mouth and all in substantially the same plane, an annular member placed upon said lugs and extending around the kettle, a mass of packing placed around said kettle wall on said lugs and annular member and between the kettle and jacket, a second annular member placed over said packing and apparatus to draw said second annular member in a direction parallel to the kettle walls only to compress and hold the packing in the cell without injury to the enamel.

In witness whereof, I have signed my name hereunto this 14 day of March, 1916.

RUDOLF F. GOECKE.

Copies of this patent may be obtained for five cents each, by addressing the "Commissioner of Patents, Washington, D. C."